Figure 1:
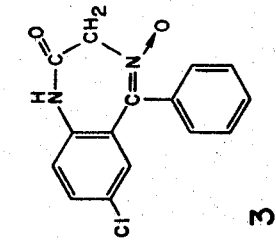
Figure 1:
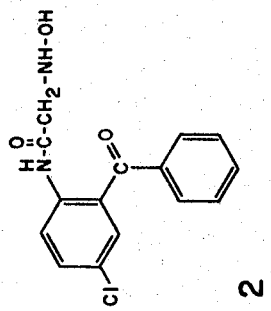
Figure 1:
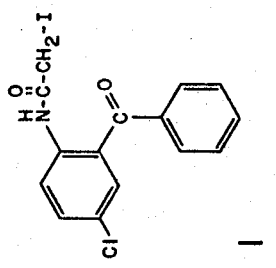

April 11, 1967  S. C. BELL  3,313,805
PROCESS FOR PREPARING 1,3-DIHYDRO-5-ARYL-2H-1,
4-BENZODIAZEPIN-2-ONE 4-OXIDES
Original Filed Aug. 13, 1963

3

↑

2

↑

1

6

↑

5

4

INVENTOR
STANLEY C. BELL
BY Vito Victor Bellino
ATTORNEY

United States Patent Office 3,313,805
Patented Apr. 11, 1967

3,313,805
PROCESS FOR PREPARING 1,3-DIHYDRO-5-ARYL-2H-1,4-BENZODIAZEPIN-2-ONE 4-OXIDES
Stanley C. Bell, Penn Valley, Pa., assignor to American Home Products Corporation, New York, N.Y., a corporation of Delaware
Original application Aug. 13, 1963, Ser. No. 301,873. Divided and this application June 21, 1966, Ser. No. 559,275
4 Claims. (Cl. 260—239.3)

This application is a division of my co-pending application Ser. No. 301,873 filed Aug. 13, 1963, which is a continuation-in-part of my co-pending applications Ser. No. 283,966 and Ser. No. 283,967, both filed May 29, 1963, and both now abandoned.

This invention relates to novel processes for preparing compositions of matter classified in the art of chemistry as benzodiazepin-2-ones, and to novel intermediates for their preparation.

The invention sought to be patented in a process of making aspect, is described as residing in the concept of a sequence of reactions including: converting the 2-haloacetamido radical, which is attached in the 2-position of the benzophenone nucleus, to the 2-hydroxyaminoacetamido radical by treatment of the benzophenone compound with hydroxylamine; and cyclizing said 2-(2-hydroxyaminoacetamido) benzophenone to form a 1,3-dihydro-2H-1,4-benzodiazepin-2-one 4-oxide.

The invention sought to be patented in a second principal process of making aspect is described as residing in the concept of converting the 2-haloacetamido radical, which is attached in the 2-position of the benzophenone nucleus, of a 2-(2-haloacetamido) benzophenone to the 2-hydroxyaminoacetamido radical by treatment of the benzophenone compound with hydroxylamine.

The invention sought to be patented in a third process of making aspect is described as residing in the concept of cyclizing a 2-(2-hydroxyaminoacetamido) benzophenone to form a 1,3-dihydro-2H-1,4-benzodiazepin-2-one 4-oxide.

The invention sought to be patented in its principal composition aspect, is described as residing in the concept of the benzophenone nucleus having attached thereto in the 2-position thereof a 2-hydroxy-aminoacetamido radical.

The tangible embodiments of the composition aspect of the invention possess the inherent general physical properties of being crystalline solids. Examination of compounds produced according to the hereinafter described process reveals upon nuclear magnetic resonance, ultraviolet and infrared spectrographic analyses, spectral data confirming the molecular structure hereinbefore set forth. For example, the

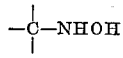

frequency characteristic of the compounds is evident. The aforementioned physical characteristics, taken together with the nature of the starting materials, the mode of synthesis and reactions of the compositions sought to be patented positively confirm their structure.

The tangible embodiments of the compositions of the present invention possess the inherent applied use characteristic of being useful as intermediates for the preparation of 5-phenyl-1,3-dihydro-2H-1,4-benzodiazepin-2-one 4-oxides, which in turn possess the inherent applied use characteristics of exerting a psycholeptic effect in mammals, as evidenced by evaluation according to standard test procedures.

Figure 2:
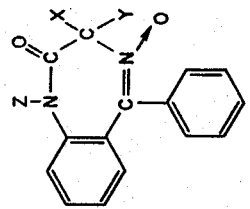
Figure 2:
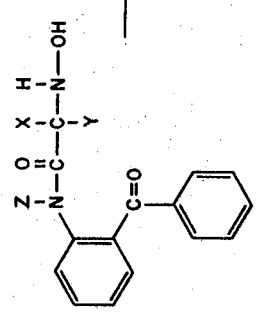
Figure 2:
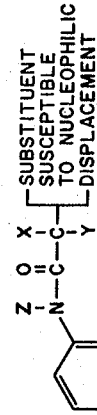

The manner and process of making and using the processes and compositions of the invention will now be generally described so as to enable a person skilled in the art of chemistry to use the same, as follows:

The new processes of my invention are illustrated schematically for a specific embodiment in FIGURE 1, and more specifically in FIGURE 2 of the attached drawing, to which the numerals in parenthesis in the following description refer.

When a 2-(2-haloacetamido) benzophenone (1) (4) is treated with hydroxylamine or a salt thereof under the hereinafter described conditions, I have discovered that, contrary to what would be expected by one with ordinary skill in the art of chemistry, even in the presence of a large excess of hydroxylamine, a substantially selective displacement of halogen occurs and surprisingly, a good yield of 2-(2-hydroxyaminoacylamino)phenyl aryl ketone (2) (5) is obtained instead of the classical ketone hydroxylamine reaction derivative, i.e., the corresponding oxime. This reaction is preferably performed at a pH range of from about 4 to about 9 in a solvent mixture comprising water and a water-soluble organic solvent such as methanol, ethanol, dioxane, or dimethylformamide, in order to obtain optimum yield. The reaction may also be run in non-aqueous media, with or without a water-soluble organic solvent. Preferably the reaction is conducted at temperatures ranging from about 30° C. to the reflux temperature of the solvent mixture for a period of time ranging from about one-quarter to about two hours. The reaction mixture can then be diluted with water to precipitate the 2-(2-hydroxyaminoacetamido)phenyl aryl ketone (2) (5) in a readily isolatable form. The intermediate 2-(2-hydroxyaminoacetamido) phenyl aryl ketone (2) (5) need not be isolated or, if isolated, said intermediate may be redissolved in a wettable aqueous or non-aqueous organic solvent. On treatment with a cyclizing agent there is obtained a 1,3-dihydro-5-aryl-2H-1,4-benzodiazepin-2-one 4-oxide (3), or when the cyclizing agent is an alkali metal hydroxide, its alkali metal salt. When the salt is obtained, neutralization with acid gives the 1,3-dihydro-5-aryl-2H-1,4-benzodiazepin-2-one 4-oxide (3).

The cyclizing medium may be one containing an ionizable acid such as acetic, sulfuric, benzenesulfonic, paratoluene-sulfonic, or hydrochloric acid, or one containing an alkali metal or alkaline earth metal hydroxide such as sodium, potassium, or calcium hydroxide.

The 2-(2-haloacetamido)phenyl aryl ketones employed as starting materials in conducting our process are known or are readily prepared by procedures known to those skilled in the art.

It will be apparent from the disclosure herein to those skilled in the art of organic chemistry that for the purposes of this invention certain of the carbon and nitrogen atoms of the 2-(2-haloacetamido)phenyl mono-cyclic aryl ketones employed as starting materials can be substituted with groups which do not interfere with the hydroxyamination reaction involving the 2-halo atom. Therefore, in the processes of the invention, except for any limitations expressed in this specification all 2-(2-haloacetamido) phenyl mono-cyclic aryl ketones can be employed as starting materials in the process of making aspect of this invention. Similarly, in 2-(2-haloacylamino)phenyl mono-cyclic aryl ketones and in the 2-(2-hydroxyaminoacylamino)phenyl mono-cyclic aryl ketones formed as intermediates the acylamino nitrogen can be substituted (FIGURE 2, Z) with hydrogen, an alkyl group such as methyl, ethyl, isopropyl, an alkenyl group such as allyl and methallyl or a lower aralkyl group such as benzyl or phenethyl. The 2-carbon of the acetamido group, i.e., that to which the carbonyl group is attached, in the 2-haloacetamido compounds and in the 2-hydroxyaminoacetamido compounds can be substituted (FIGURE 2, X and Y) with hydrogen or with alkyl, aromatic, or aralkyl radicals, including the straight and branched chain alkyl radicals, among which are, for the purpose of illustration but without limiting the generality of the foregoing, mono- or di-alkyl radicals such as methyl, ethyl, propyl, isopropyl, n-butyl t-butyl, isoamyl, said di-alkyl radical having two similar or two different alkyl groups and which can be concatenated to form a hydrocarbon ring; the cyclized lower alkyl radicals such as cyclopropyl, cyclobutyl, cyclopentyl; the unsaturated mono- and di-radicals such as vinyl, ethynyl, propenyl; the aromatic radicals such as phenyl or phenyl substituted with non-interfering groups such as halogen, lower-alkyl, hydroxy, etc.; and the aromatic-aliphatic radicals benzyl, or phenethyl, wherein the phenyl group may be similarly substituted or unsubstituted.

The phenyl group bearing the acetamido substituent can have one or more substituents other than hydrogen, as for example, but without limitation, lower alkyl, chlorine, bromine, trifluoromethyl or methylsulfonyl at the 3-, 4-, 5-, or 6-positions and such substituents do not interfere with the course of the reactions here involved. The aryl group can be phenyl, 2- or 3-thienyl; 2- or 3-furyl; 2-, 3- or 4-pyridyl; or 1- or 2-naphthyl. The phenyl nucleus of the phenylketo group can bear one or more simple subsituents inert to the reactions herein described, such as lower alkyl, chlorine, bromine, trifluoromethyl, or methylsulfonyl and such substituted phenyl-keto compounds are full equivalents of the unsubstituted phenyl nucleus for the purposes of the present invention.

From the disclosure herein illustrating the invention as applied to starting materials which produce compounds wherein the 5-position substituent is phenyl or substituted phenyl, it will be apparent to organic chemists that other mono-cyclic nuclei can be in the starting materials in lieu of phenyl without affecting the course of the reaction involved in the hydroxyamination and the subsequent ring closure. Accordingly, such reactions wherein the phenyl group is replaced by 2- or 3-thienyl; 2- or 3-furyl; and 2-, 3- or 4-pyridyl radicals are the full equivalents of the invention as particularly claimed.

When the starting compounds are substituted as hereinbefore recited, it will be apparent herefrom to those skilled in the art of chemistry that the intermediate compounds and the final products formed by the process of invention will bear, correspondingly, the same substituents.

It also will be apparent herefrom to one skilled in the art of organic chemistry that the hereinbefore described starting compounds, namely, the 2-(2-haloacetamido)phenyl mono-cyclic aryl ketones can be either 2-(2-chloroacetamido)phenyl aryl ketones, 2-(2-bromoacetamido)phenyl aryl ketones or 2-(2-iodoacetamido)phenyl aryl ketones, namely those subject to nucleophilic displacement or the equivalent thereof such as 2-(2-tosyloxyacetamido)phenyl mono-cyclic aryl ketones. For best results when using the chloro- and bromo-compounds, it is preferred, though not essential, to add a small amount of a water-soluble iodide salt such as sodium or potassium iodide.

The following example illustrates the best mode contemplated by the inventor of using the claimed process of the invention and of the manner of making and using a specific embodiment of the claimed compositions of the invention.

EXAMPLE 1

To a mixture of 2.1 g. of hydroxylamine hydrochloride and 5 ml. of 4 N sodium hydroxide in 75 ml. of alcohol and 25 ml. of water add 3.6 g. of 5-chloro-2-(2-iodoacetamido)benzophenone and reflux the reaction mixture for 20 minutes. Add sodium hydroxide to the resultant solution to neutralize any unreacted hydrochloride. Dilute the solution with 100 ml. of water. Filter from impurities, acidify the solution with acetic acid and collect the resultant solid. Recrystallize from ethanol to obtain 7-chloro-1,3-dihydro-5-phenyl-2H-1,4-benzodiazepin-2-one 4-oxide, M.P. 235–237° C.

The following examples further illustrate the claimed processes and the method for preparing and using the compositions of the invention.

Prepare 7 - chloro - 1,3 - dihydro - 5 - (2 - thienyl)-2H-1,4-benzodiazepin-2-one 4-oxide from 2-(2-chloroacetamido)-5-chlorophenyl-2-thienyl ketone by the procedure described above.

Prepare 1,3 - dihydro - 5 - phenyl - 7 - trifluoromethyl-2H-1,4-benzodiazepin-2-one 4-oxide from 2-(2-bromoacetamido)-5-trifluoromethylbenzophenone by the procedure described above.

Prepare 1 - allyl - 7 - chloro - 1,3 - dihydro - 5 - phenyl-2H-1,4-benzodiazepin-2-one 4-oxide from 2-(2-bromo-N-allylacetamido)-5-chlorobenzophenone by the procedure described above.

Prepare 1 - benzyl - 7 - chloro - 1,3 - dihydro - 5-phenyl-2H-1,4-benzodiazepin-2-one 4-oxide from 2-(2-bromo-N-benzylacetamido)-5-chlorobenzophenone by the procedure described above.

Prepare 7,8 - dichloro - 1,3 - dihydro - 5 - phenyl-2H-1,4-benzodiazepin-2-one 4-oxide from 2-(2-bromoacetamido)-4,5-dichlorobenzophenone by the procedure described above.

Prepare 1,3 - dihydro - 7 - nitro - 5 - phenyl - 2H - 1,4-benzodiazepin-2-one 4-oxide from 2-(2-iodoacetamido)-5-nitrobenzophenone by the procedure described above.

Prepare 1,3 - dihydro - 7 - methylsulfonyl - 5 - phenyl-2H-1,4-benzodiazepin-2-one 4-oxide from 2-(2-iodoacetamido)-5-methylsulfonylbenzophenone by the procedure described above.

Prepare 1,3 - dihydro - 5 - (o - chlorophenyl) - 2H-1,4-benzodiazepin-2-one 4-oxide from o-(2-chloroacetamido)phenyl o-chlorophenyl ketone by the procedure described above.

Prepare 1,3 - dihydro - 5 - (p - methoxyphenyl) - 2H-1,4-benzodiazepin-2-one 4-oxide from o-(2-chloroacetamido)phenyl p-methoxyphenyl ketone by the procedure described above.

Prepare 1,3 - dihydro - 5 - (p - tolyl) - 2H - 1,4-benzodiazepin-2-one 4-oxide from o-(2-chloroacetamido)phenyl p-tolyl ketone by the procedure described above.

Prepare 1,3 - dihydro - 5 - (m - trifluoromethylphenyl)-2H-1,4-benzodiazepin-2-one 4-oxide from o-(2-chloroacetamido)phenyl m-trifluoromethyl phenyl ketone by the procedure described above.

Prepare 7 - chloro - 1,3 - dihydro - 3 - methyl - 5-phenyl-2H-1,4-benzodiazepin-2-one 4-oxide from 5-chloro-2-(2-chloropropionamido)benzophenone by the procedure described above.

Prepare 7 - bromo - 5 - (p - chlorophenyl) - 1,3-dihydro-2H-1,4-benzodiazepin-2-one 4-oxide, M.P. 260–261° dec., from 5-bromo-2-(2-bromoacetamido)phenyl p-chlorophenyl ketone by the procedure described above.

Prepare 7 - chloro - 1,3 - dihydro - 1 - methyl - 5-phenyl-2H-1,4-benzodiazepin-2-one 4-oxide, M.P. 178–180°, from 5-chloro-2-(2-iodo-N-methylacetamido)benzophenone by the procedure described above.

EXAMPLE 2

Stir a mixture of 5.0 g. of 5-chloro-2(2-iodoacetamido)benzophenone, 7.0 g. of hydroxylamine hydrochloride, 20 ml. of water, 20 ml. of 4 N sodium hydroxide solution, and 60 ml. of dimethylformamide at room temperature until a clear solution results (one-half hour). Add 100 ml. of water and collect the resultant solid and recrystallize from benzene to obtain pure 5-chloro-2-(2-hydroxyaminoacetamido)benzophenone, M.P. 129–131°.

Analysis.—Calcd. for $C_{15}H_{13}ClN_2O_3$: C, 59.10; H, 4.30; Cl, 11.64; N, 9.21. Found: C, 59.38; H, 4.16; Cl, 11.70; N, 9.00.

Prepare o-(2-hydroxyaminoacetamido)phenyl 2-thienyl ketone from o-(2-chloroacetamido)phenyl 2-thienyl ketone by the procedure described above.

Prepare 5 - trifluoromethyl - 2 - (2 - hydroxyaminoacetamido)benzophenone from 2-(2-bromoacetamido)-5-trifluoromethylbenzophenone by the procedure described above.

Prepare 5-chloro-2-(2 - hydroxyamino-N-allylacetamido)-benzophenone from 2-(2-bromo-N-allylacetamido)-5-chlorobenzophenone by the procedure described above.

Prepare 5-chloro-2-(2-hydroxyamino-N-benzylacetamido)-benzophenone from 2-(2-bromo-N-benzylacetamido)-5-chlorobenzophenone by the procedure described above.

Prepare 2-(2-hydroxyaminoacetamido) - 5,6 - dichlorobenzophenone from 2-(2-bromoacetamido)-5,6-dichlorobenzophenone by the procedure described above.

Prepare 2-(2 - hydroxyaminoacetamido)-5-nitrobenzophenone from 2-(2-iodoacetamido)-5-nitrobenzophenone by the procedure described above.

Prepare 2-(2 - hydroxyaminoacetamido)-5-methylsulfonylbenzophenone from 2-(2-iodoacetamido)-5-methylsulfonylbenzophenone by the procedure described above.

Prepare o-(2-hydroxyaminoacetamido)phenyl o-chlorophenyl ketone from o-(2-chloroacetamido)phenyl o-chlorophenyl ketone by the procedure described above.

Prepare o - (2 - hydroxyaminoacetamido)phenyl p-methoxyphenyl ketone from o-(2-chloroacetamido)phenyl p-methoxyphenyl ketone by the procedure described above.

Prepare o-(2-hydroxyaminoacetamido)phenyl m-trifluoromethyl phenyl ketone from o-(2-chloroacetamido)phenyl m-trifluoromethyl phenyl ketone by the procedure described above.

Prepare o-(2-hydroxyaminoacetamido)phenyl p-tolyl ketone from o-(2-chloroacetamido)phenyl p-tolyl ketone by the procedure described above.

Prepare 5-chloro-2-(2 - hydroxyaminopropionamido) benzophenone from 5-chloro-2-(2-chloropropionamido) benzophenone by the procedure described above.

EXAMPLE 3

Stir a mixture of 4.0 g. of 5-chloro-2-(2-chloroacetamido)benzophenone, 7.0 g. of hydroxylamine hydrochloride, 10 ml. of water, 20 ml. of 4 N sodium hydroxide, 100 ml. of dimethylformamide and 0.2 g. of sodium iodide at 50° until a clear solution is obtained (ca. one-half hour). Add 100 ml. of water. Cool to precipitate and recrystallize the precipitate in alcohol and then benzene to obtain 5 - chloro-2-(2 - hydroxyaminoacetamido)benzophenone, M.P. 129–131°.

EXAMPLE 4

Acidify the clear solution of Example 3 with hydrochloric acid and warm to obtain 7-chloro-1,3-dihydro-5-phenyl-2H-1,4-benzodiazepin-2-one 4 - oxide, M.P. 235–237° as a precipitate.

EXAMPLE 5

Add a suspension of 1.0 g. of 5-chloro-2-(2-hydroxyaminoacetamido)benzophenone in 30 ml. of 50% alcohol, 2 ml. of 6 N hydrochloric acid and heat the mixture on the steambath for 10 minutes. Dilute solution with an equal volume of water and cool to obtain a precipitate of 7-chloro-1,3-dihydro - 5 - phenyl-2H-1,4-benzodiazepin-2-one 4-oxide.

EXAMPLE 6

Warm a solution of 5-chloro-(2-hydroxyaminoacetamido)benzophenone in acetic acid containing gaseous hydrochloric acid on a steam bath and then dilute with water to obtain 7-chloro-1,3-dihydro-5-phenyl-2H-1,4-benzodiazepin-2-one 4-oxide.

EXAMPLE 7

Add a mixture of 2.1 g. of hydroxylamine hydrochloride and 5 ml. of 4 N sodium hydroxide in 75 ml. of alcohol and 25 ml. of water, 3.6 g. of 5-chloro-2-(2-iodoacetamido)benzophenone and reflux the mixture for 20 minutes. Add sodium hydroxide to the resultant solution and dilute the solution with 100 ml. of water. Filter the solution and acidify with acetic acid. Collect resultant solid and recrystallize from ethanol to obtain 7-chloro-1,3-dihydro-5-phenyl-2H-1,4-benzodiazepin-2-one 4-oxide, M.P. 235–237°.

Prepare 7-chloro-1,3-dihydro-5-(2-thienyl)-2H-1,4-benzodiazepin-2-one 4-oxide from 2-(2-hydroxyaminoacetamido)-5-chlorophenyl 2-thienyl ketone by the procedure described above.

Prepare 1,3-dihydro-5-phenyl-7-trifluoromethyl-2H-1,4-benzodiazepin-2-one 4-oxide from 5-trifluoromethyl-2-(2-hydroxyaminoacetamido)benzophenone by the procedure described above.

Prepare 1-allyl-7-chloro-1,3-dihydro-5-phenyl-2H-1,4-benzodiazepin-2-one 4-oxide from 5-chloro-2-(2-hydroxyamino-N-allylacetamido)benzophenone by the procedure described above.

Prepare 1-benzyl-7-chloro-1,3-dihydro-5-phenyl-2H-1,4-benzodiazepin-2-one 4-oxide from 5-chloro-2-(2-hydroxyamino-N-benzylacetamido)benzophenone by the procedure described above.

Prepare 7,8-dichloro-1,3-dihydro-5-phenyl-2H-1,4-benzodiazepin-2-one 4-oxide from 2-(2-hydroxyaminoacetamido)-4,5-dichlorobenzophenone by the procedure described above.

Prepare 1,3-dihydro-7-nitro-5-phenyl-2H-1,4-benzodiazepin-2-one 4-oxide from 2-(2-hydroxyaminoacetamido)-5-nitrobenzophenone by the procedure described above.

Prepare 1,3-dihydro-7-methylsulfonyl-5-phenyl-2H-1,4-benzodiazepin-2-one 4-oxide from 2-(2-hydroxyaminoacetamido)-5-methylsulfonylbenzophenone by the procedure described above.

Prepare 1,3-dihydro-5-(o-chlorophenyl)-2H-1,4-benzodiazepin-2-one 4-oxide from o-(2-hydroxyaminoacetamido)phenyl o-chlorophenyl ketone by the procedure described above.

Prepare 1,3-dihydro-5-(p-methoxyphenyl)-2H-1,4-benzodiazepin-2-one 4-oxide from o-(2-hydroxyaminoacetamido)phenyl p-methoxyphenyl ketone by the procedure described above.

Prepare 1,3-dihydro-5-(p-tolyl)-2H-1,4-benzodiazepin-2-one 4-oxide from o-(2-hydroxyaminoacetamido)phenyl p-tolyl ketone by the procedure described above.

Prepare 1,3-dihydro-5-(m-trifluoromethylphenyl)-2H-1,4-benzodiazepin-2-one 4-oxide from o-(2-hydroxyaminoacetamido)phenyl m-trifluoromethylphenyl ketone by the procedure described above.

Prepare 7-chloro-1,3-dihydro-3-methyl-5-phenyl-2H-1,4-benzodiazepin-2-one 4-oxide from 5-chloro-2-(2-hydroxyaminopropionamido)benzophenone by the procedure described above.

EXAMPLE 8

To a suspension of 1.0 g. of 5-chloro-2-(2-hydroxyaminoacetamido)benzophenone in 30 ml. of 50% alcohol, add 2 ml. of sodium hydroxide. Dilute the solution with an equal volume of water and acidify with acetic acid. Collect the solid 7-chloro-1,3-dihydro-5-phenyl-2H-1,4-benzodiazepin-2-one 4-oxide and wash with ether.

The subject matter which the applicant regards as his invention is particularly pointed out and distinctly claimed as follows:

1. The process for preparing 1,3-dihydro-2H-1,4-benzodiazepin-2-one 4-oxide comprising: converting the 2-haloacetamido radical, which is attached in the 2-position of the benzophenone nucleus, to the 2-hydroxyaminoacetamido radical by treatment of the benzophenone compound with hydroxylamine; and cyclizing said 2-(2-hydroxyaminoacetamido)benzophenone.

2. The process of claim 1 wherein the acetamidophenyl of the 2-(2-haloacetamido)benzophenone is substituted with chlorine at the 5-position.

3. The process for preparing 1,3-dihydro-2H-1,4-benzodiazepin-2-one 4-oxide comprising: cyclizing a 2-(2-hydroxyaminoacetamido)benzophenone.

4. The process of claim 3 wherein the acetamidophenyl of the 2-(2-hydroxyaminoacetamido)benzophenone is substituted with chlorine at the 5-position.

No references cited.

ALEX MAZEL, *Primary Examiner*.

ALTON D. ROLLINS, *Assistant Examiner*.